(12) United States Patent
Eliyahu

(10) Patent No.: US 9,857,842 B2
(45) Date of Patent: Jan. 2, 2018

(54) UNIVERSAL TABLET DOCKING STATION

(71) Applicant: Nexark, Inc., Los Angeles, CA (US)

(72) Inventor: Menachem Eliyahu, Los Angeles, CA (US)

(73) Assignee: NEXARK, INC., Los Angeles, CA (US)

( * ) Notice: Subject to any disclaimer, the term of this patent is extended or adjusted under 35 U.S.C. 154(b) by 0 days.

(21) Appl. No.: 14/843,477

(22) Filed: Sep. 2, 2015

(65) Prior Publication Data

US 2017/0060186 A1 Mar. 2, 2017

(51) Int. Cl.
*G06F 1/16* (2006.01)

(52) U.S. Cl.
CPC .................................. *G06F 1/1632* (2013.01)

(58) Field of Classification Search
CPC combination set(s) only.
See application file for complete search history.

(56) References Cited

U.S. PATENT DOCUMENTS

| 6,937,468 | B2* | 8/2005 | Lin | G06F 1/1632 |
| | | | | 361/679.41 |
| 7,911,779 | B1* | 3/2011 | Tarnoff | G06F 1/1626 |
| | | | | 361/679.4 |
| 8,315,048 | B2* | 11/2012 | Tarnoff | G06F 1/1626 |
| | | | | 361/679.4 |
| 8,654,522 | B2* | 2/2014 | Ishida | F16M 11/041 |
| | | | | 248/346.03 |
| 8,773,850 | B2* | 7/2014 | Minaguchi | H04N 5/64 |
| | | | | 361/679.41 |
| 8,913,380 | B2* | 12/2014 | Enomoto | G06F 1/1632 |
| | | | | 361/679.41 |
| 2014/0049904 | A1* | 2/2014 | Hume | G06F 1/1632 |
| | | | | 361/679.41 |
| 2014/0153182 | A1* | 6/2014 | North | G06F 1/1632 |
| | | | | 361/679.41 |
| 2015/0022899 | A1* | 1/2015 | Wunderlich | G02B 9/60 |
| | | | | 359/662 |
| 2015/0036283 | A1* | 2/2015 | Suckle | G06F 1/1632 |
| | | | | 361/679.43 |
| 2015/0362953 | A1* | 12/2015 | Shindo | H02J 7/0044 |
| | | | | 361/679.41 |

\* cited by examiner

*Primary Examiner* — Lisa Lea Edmonds
(74) *Attorney, Agent, or Firm* — Leason Ellis LLP

(57) ABSTRACT

A universal docking station for supporting and connecting to a tablet has a housing with a generally V-shaped slot running horizontally across the front thereof. By placing the tablet on its side in the slot and connecting it to the station by cable, the station can accommodate a wide variety of table shapes and configurations. To further stabilize the tablet, a strip of resilient material is provided at the bottom of the slot.

5 Claims, 3 Drawing Sheets

UNIVERSAL TABLET DOCKING STATION

FIELD OF THE INVENTION

The present invention relates to the physical organization of computer components and, more particularly, to docking stations for computer components.

BACKGROUND OF THE INVENTION

At the beginning of the personal computer era the equipment included a processor, display, keyboard and/or pointing device (e.g., mouse), disk drive and perhaps a printer, all located on a desktop. One of the principle uses of these computer systems, in addition to local computing in terms of word processing and spread sheets, was access to the internet. In response to a desire for mobility, laptop computers were developed that included the processor, keyboard, pointing device, disk drive and display in a single case that was some what portable. Over time the size and weight of laptops improved so that they became more portable.

A later development was the advent of smaller and even more mobile devices called tablets. However, these tablet devices tended to have limited computing capability, and sometimes were basically single use devices, e.g., a Kindle® book reader. However, they did have the ability to connect to the internet. Docketing stations were developed along with these tablets which acted as convenient ways to charge the device.

More recently the computing power of tablets has increased and a desire to use them as the processor of a desktop setup has increased. Examples include the Apple® IPad® and the Microsoft Surface Pro. In particular, a user of the tablet can use it outside of the office or home, with limited printing and display capabilities. Then, when the user returns to the office or home this device can be plugged into a docking station for recharging. Further, the docking station can provide connections to a display, printer or other computer peripheral devices at that location to form a desktop computing system with the tablet at its heart. Examples of this are the Toshiba 7" Tablet Dock and the Lenovo ThinkPad Tablet Dock.

Currently docking stations are especially designed for a particular tablet. They have a vertically extending slot which is sized for the tablet and typically a connector is provided at the bottom of the slot to engage a bottom connector on the tablet when the tablet is slid into the slot. However, tablets have various dimensions and utilize different connectors. As a result, the docking station for one tablet is typically unusable by another tablet.

SUMMARY OF THE INVENTION

The present invention is directed to a docking device for a portable computer access device such as a tablet, and more particularly, to a universal docking station that is capable of handling various different tablets.

In an exemplary embodiment of the present invention the docking station has a V-shaped horizontal slot to receive the tablet laid horizontally or laterally in the slot. There is no connector in the slot. Instead, the tablet is connected to the docking station by a cable which has a terminal for the tablet at one end and a USB connector at the other end. Since a commercially available tablet will typically come with such a cable, the docking station will work with a wide variety of tablets by having them connect to the station or hub via a USB port on the rear of the station.

Further, the V-shape accommodates tablets of various dimensions. By laying the tablet on its side in the slot the thickness of the tablet just determines how far down into the slot the tablet will fit. However, the shape of the slop still supports the table in a stable fashion. Further, because the connection terminal is not in the base of the slot, how deep it fits in the slop is not that important. A rubber or other resilient strip of material can be located along the lower portion of the slot. As the side of the table rests in the slot it frictionally engages the resilient strip to assist in holding the tablet in a stable fashion in the slot.

A rear section of the hub or docking station has a wide variety of connectors for various peripheral devices, e.g., printer, display, etc. Along the front edge of the station is a group of indicator lights which indicates the connectors that are being utilized.

As a result of its shape the present invention is a universal docking station that can connect a tablet to various computer peripheral devices to form a desktop computing system based on the tablet.

BRIEF DESCRIPTION OF THE DRAWINGS

The foregoing and other features of the present invention will be more readily appreciated from the following detailed description and drawings of an exemplary embodiment of the invention wherein.

DETAILED DESCRIPTION OF AN EXEMPLARY EMBODIMENT OF THE INVENTION

Figure 1:
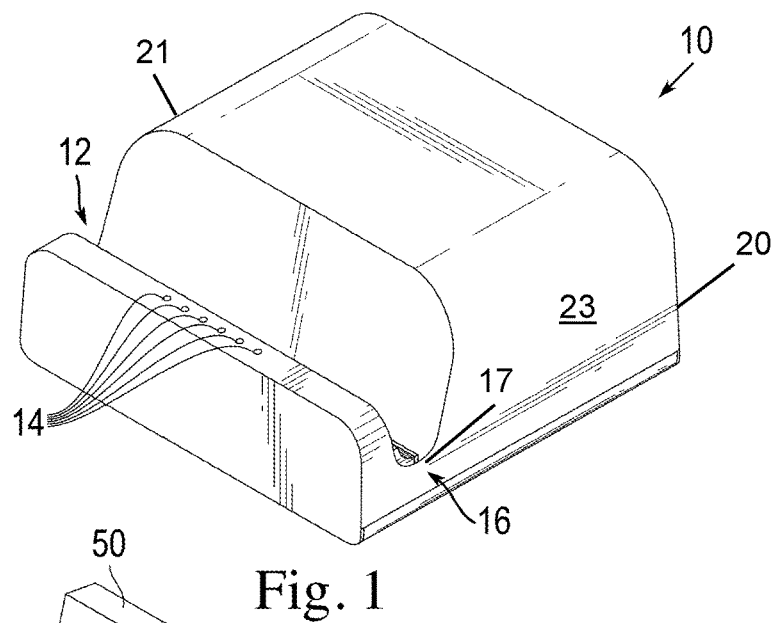
FIG. 1 is a perspective view of the universal docking station or hub of the present invention.
Figure 2:
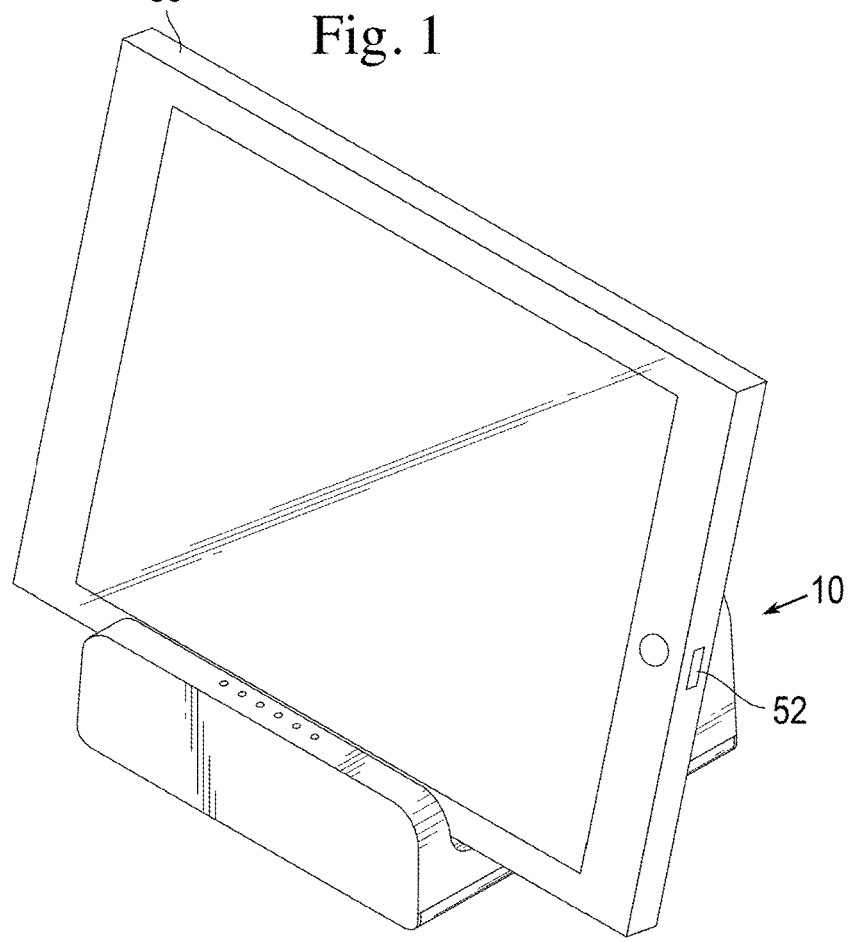
FIG. 2 is a perspective view of the universal docking station of FIG. 1 with a tablet placed horizontally in a slot in the front of that station.

A universal docking station 10 is shown in FIG. 1. It has a generally rectangular housing 20 with left and right side walls 21, 23. A pronounced V-shaped slot 12 extends across the front of the housing completely through the side walls 21, 23. As shown in FIG. 2, the slot 12 is adapted to receive a portable computer access device, such as tablet 50, which is laid on its side in the slot so that its connector 52 is exposed. When viewed from the side as in FIG. 3, it can be seen that the slot has a forward surface 13 and a rearward surface 15 that are at an angle to each other in order to form the V shape. Also, the tablet 50 is supported by the rearward surface 15 of the V-shaped slot.

At the bottom 17 of the slot 12 a rubber or other resilient strip of material 16 can be located. As the side of the tablet rests in the slot it is frictionally engaged by the resilient strip, which assists in holding the tablet in a stable position in the slot.

Figure 3:
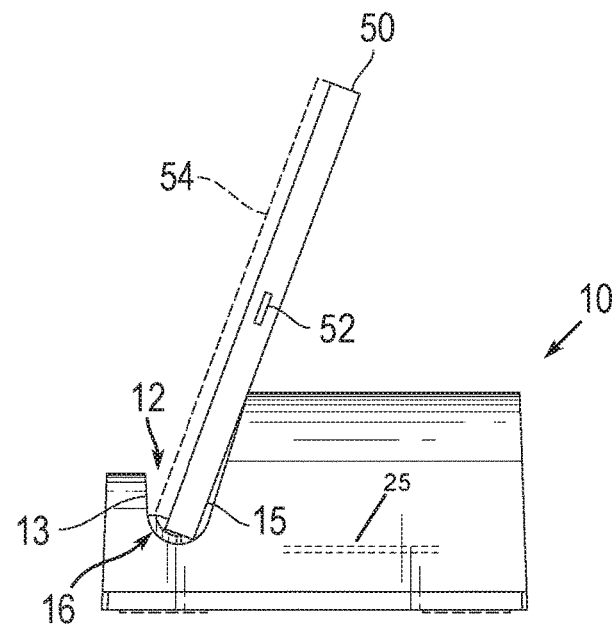
FIG. 3 is a side view of the docking station and tablet of FIG. 2.

FIG. 3 also shows in dotted line a tablet 54 that is thicker than tablet 50. As can be seen, it also fits easily in slot 12. The only difference is that the thicker tablet sits somewhat higher in the slot. Nevertheless, its side still engages strip 16. Thus, this docking station is not limited to any particular device and is truly a universal docking station.

Figure 4:
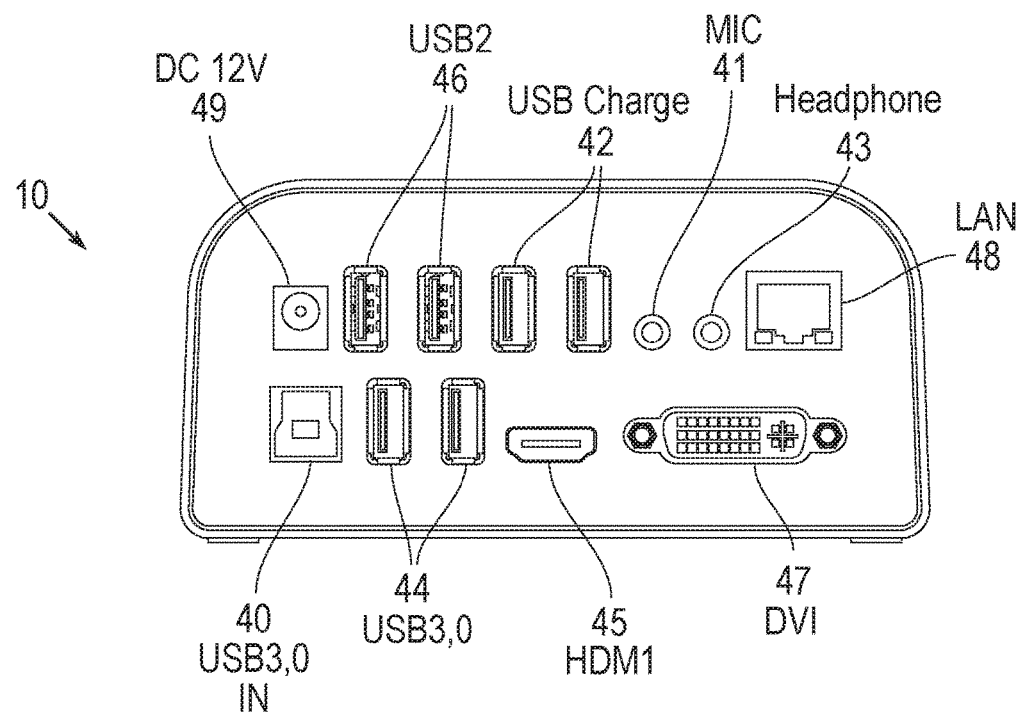
FIG. 4 is a rear view of the docking station showing the variety of communications terminals.

FIG. 4 shows the rear panel of the docking station 10. It includes a USB 3.0 IN terminal 40 through which power and signals are provided through a cable 60 (FIG. 5) to connect the tablet to other peripheral devices. FIG. 4 also shows that the station includes two USB fast charging ports 42 for charging devices such as a phone, iPad, IPod etc. There are also various communication terminals in the form of USB 3.0 ports 44 that can connect devices at maximum speeds. Two USB 2.0 ports 46 are provided to allow a mouse and keyboard to be connected to the station. In addition there are is an HDMI port 45 and a DVI port 47 for making video connections to a monitor or t.v. An Ethernet LAN connection 48 is provided along with microphone and speaker/headphone connections 41, 43. Internally, the station has circuitry 25 (shown in dotted line), e.g., multiplexing circuits, to allow communications between the tablet and other computer peripheral devices without signal collision. Such circuitry 25 is disclosed in U.S. Patent Application Publication US 2015/0022966 A1 of Chen, which is incorporated herein in its entirety. Power to drive the station electronics and its power outputs is provided through DC 12V terminal 49, which receives line power through a converter (not shown) that changes 120 VAC into 12 VDC.

Figure 5:
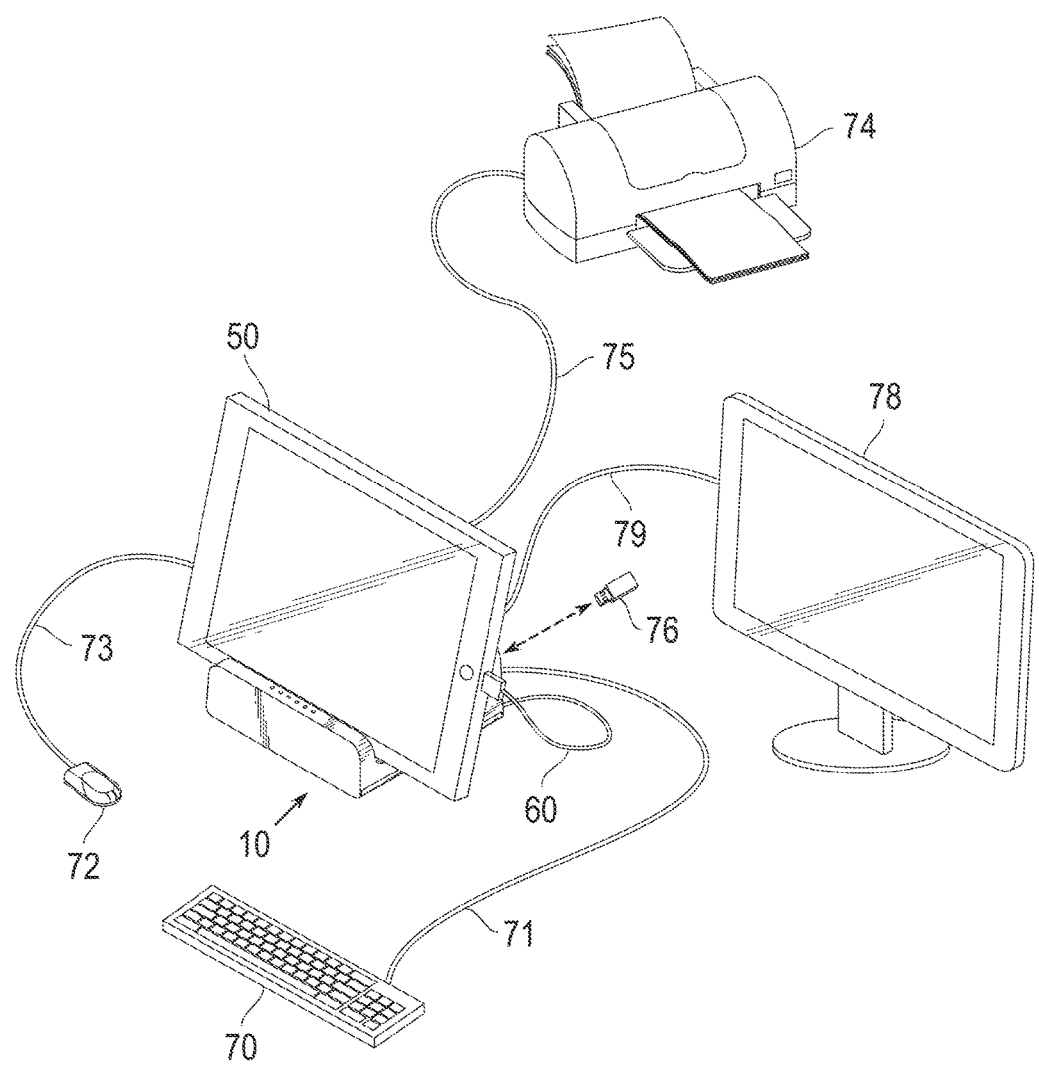
FIG. 5 is a perspective view of the docking station with a tablet, mouse, keyboard and printer connected thereto.

FIG. 5 shows a complete desktop set up with tablet 50 and the docking station 10 as the base and connected to various computer peripheral devices. In FIG. 5 a keyboard 70 is shown attached by a cable 71. Also, a mouse 72 is connected to the station by cable 73. A printer 74 is connected to station 10 by a cable 75. If desired with this setup, instead of using the display on the tablet, an external display 78 can be connected to the station by a cable 79. Finally, a USB flash memory device 76 can be plugged into a port on the station. There are indicator lights 14 along the forward edge 13 of the slot which indicate the ports that are in use. See FIG. 1.

The docking station of the present invention allows the user to route all of his or her peripherals through it. The V-shaped slot can be used to hold various devices, for example, a Macbook, which can be connected to the station via a USB cable. An IPhone can be placed in the V-shaped slot while it is being charged.

As a result the present invention is a universal docking station that operates as a multi-functional device which can charge any tablet, synchronize data and expand usability. It also provides increased connectivity through multiple ports. In effect it is like any other docking station for a laptop, notebook or a desktop.

The elements of the embodiment described above can be combined to provide further embodiments. These and other changes can be made to the system in light of the above detailed description. While the invention has been particularly shown and described herein, with reference to preferred embodiments thereof, it will be understood by those skilled in the art that various changes in form and details may be made therein without departing from the spirit and scope of the invention.

What is claimed is:

1. A universal docking station for supporting and connecting to a portable computer access device comprising:
   a housing with side walls and a generally V-shaped slot running horizontally across the front of the housing completely through the side walls, said slot having a forward surface and a rearward surface at an angle to each other, the width of the slot at a lower portion of the slot being sufficiently wide enough to accommodate the width of said access device and to support the access device stably only by a bottom portion of the slot and by resting against its rearward surface;
   a terminal by which the access device may be connected to the station by a cable; and
   a plurality of communication terminals by which various computer peripheral devices may be connected to the station.

2. The universal docking station as claimed in claim 1 further including a resilient strip located in the lower portion of the slot so as to contact an edge of the computer access device and to inhibit its motion.

3. The universal docking station as claimed in claim 1 wherein the portable computer access device is a tablet device lying on its side in the V-shaped slot with its top and bottom extending beyond the sidewalls.

4. The universal docking station as claimed in claim 1 further including a circuit to prevent signal collision between two or more such devices connected simultaneously to the communication terminals.

5. The universal docking station as claimed in claim 1 wherein the bottom of the V-shaped slot is curved.

* * * * *